June 3, 1941.  E. B. MADDOX  2,243,876
PNEUMATIC TOOL SAFETY VALVE
Filed Jan. 13, 1941  2 Sheets-Sheet 1

INVENTOR
Everett B. Maddox
BY
ATTORNEY

June 3, 1941.  E. B. MADDOX  2,243,876
PNEUMATIC TOOL SAFETY VALVE
Filed Jan. 13, 1941   2 Sheets-Sheet 2
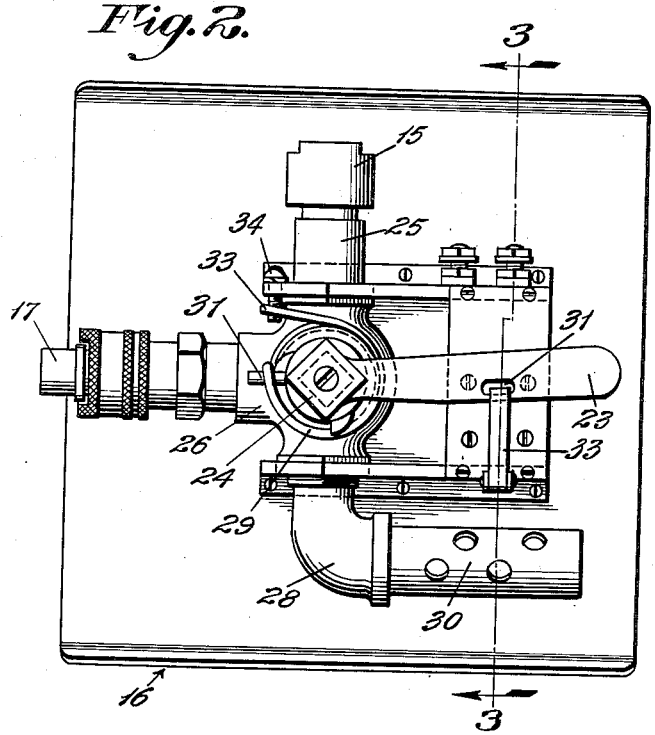
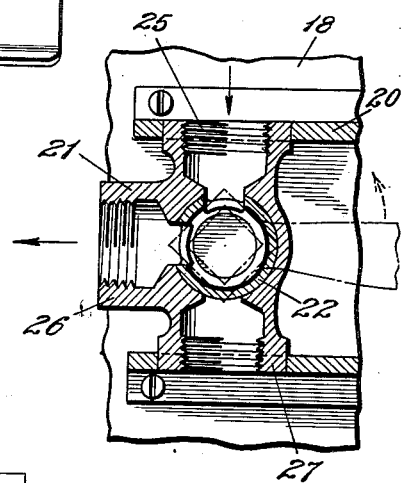
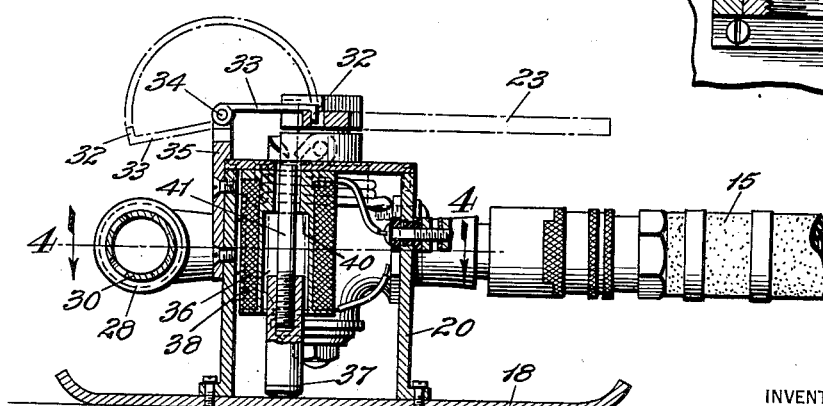
INVENTOR
*Everett B. Maddox*
BY
*W. Glenn Jones*
ATTORNEY Patented June 3, 1941

2,243,876

UNITED STATES PATENT OFFICE 2,243,876

PNEUMATIC TOOL SAFETY VALVE

Everett B. Maddox, Hyattsville, Md.

Application January 13, 1941, Serial No. 374,275

10 Claims. (Cl. 121—35)

(Granted under the act of March 3, 1883, as amended April 30, 1928; 370 O. G. 757)

This invention relates to a pneumatic tool safety valve, and has for an object to provide a safety valve to be inserted in the pressure line of a pneumatic tool and so connected that it will automatically stop the operation of the pneumatic tool should the point of the pneumatic tool accidentally touch a hidden metallic member, such as a buried gas or water pipe, for instance.

A further object of this invention is to provide a safety valve for use with pneumatic tools which may be used in digging through rock, concrete or earth beneath which may be buried metallic gas, water, sewer, or other pipes which it is desired to expose without accidentally injuring the same while such pipes are still partly buried.

With this invention the first contact of any portion of the pneumatic tool with any portion of the metallic pipe will accidentally stop the operation of the pneumatic tool, thus preventing continued operation of the tool from injuring the metallic pipe.

With the foregoing and other objects in view, the invention consists in the construction, combination and arrangement of parts hereinafter described and illustrated in the drawings, in which:

Fig. 2 is a plan view of the valve;

Fig. 3 is a vertical sectional view on line 3—3 of Fig. 2; and

Fig. 4 is a horizontal sectional view on line 4—4 of Fig. 3, rotated 90° counterclockwise, showing the valve body disposed as in Fig. 2.

Figure 1:
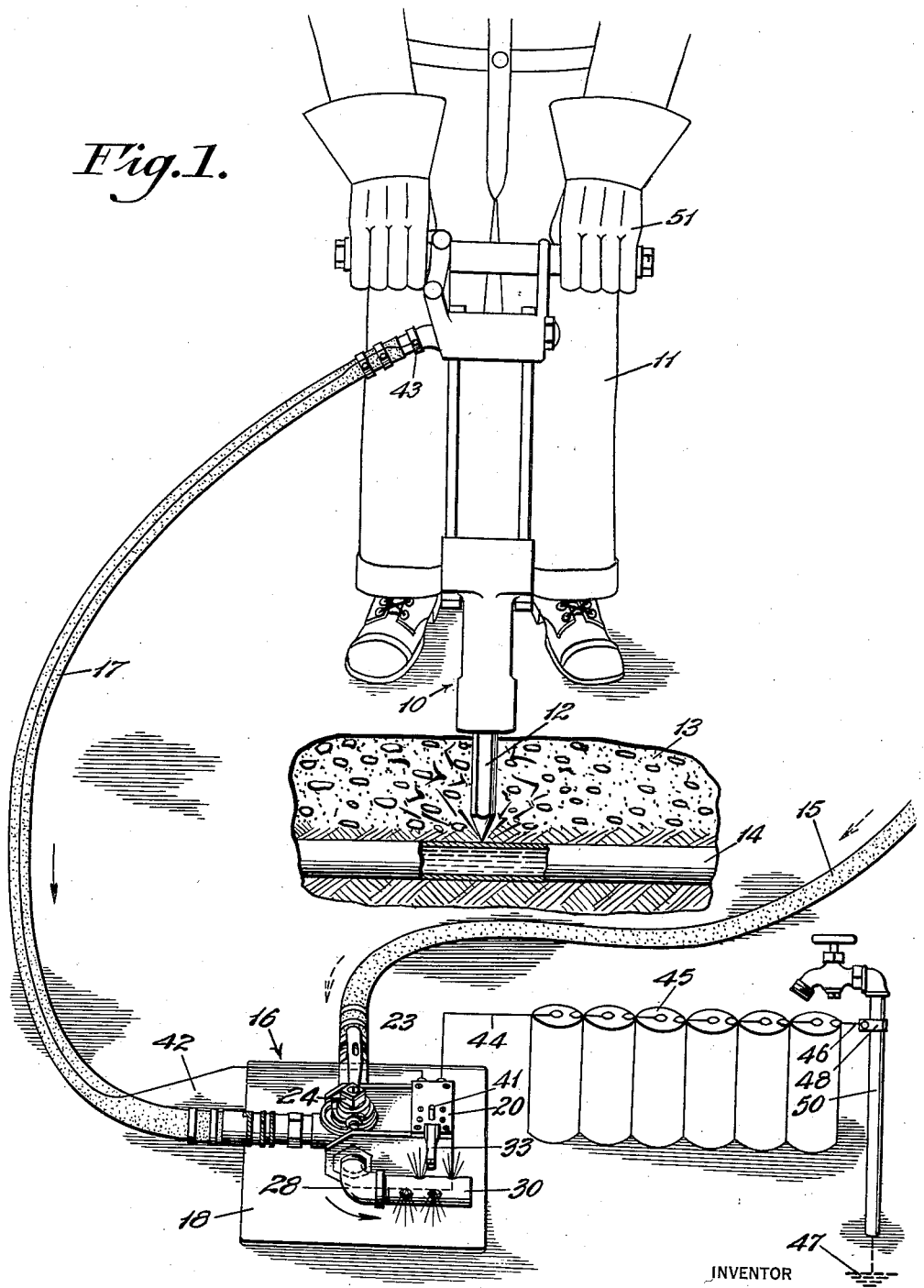
Fig. 1 is a schematic perspective view showing the safety valve in operation.

There is shown at 10 a pneumatic tool of a conventional construction held by a drillman 11 with the bull point 12 thereof used in the tool 10 shown as having just penetrated through the concrete 13 into contact with a water pipe 14 buried therebeneath. Leading from a conventional source of pneumatic power or compressed air is a hose 15 which, instead of being directly connected to the tool 10, is connected through a valve 16 and a section of air hose 17 which connects to the tool 10.

This valve 16 constitutes the essential portion of this invention and includes a base 18 on which it may rest at any convenient location. Secured on the base 18 is a housing 20 in which is supported a three-way valve body 21 within which is a hollow rotatable valve plug 22 whose position is controllable by a valve handle 23 suitably secured to the valve plug stem 24. The valve body 21 is provided with a threaded nipple 25 to which the hose 15 is suitably connected, a second threaded nipple 26 to which the hose 17 is suitably connected, and a third threaded nipple 27 to which an exit pipe 28, discharging through an exhaust muffler 30 to the atmosphere, is connected. Extending from the valve stem 24 is a pin 31 serving as an anchor for one end of a coil spring 29 coiled about the valve stem 24 and having its other end 33 suitably anchored as at 34 to the housing 20. This spring 29 is such that it normally tends to rotate the valve plug 22 from the position shown in Figs. 2 and 4, where the passage through hose 15 and nipple 25 is connected to the passage through nipple 26 and hose 17, and is cut off from nipple 27 to pipe 28 and exhaust 30, to a position 90° counterclockwise thereto to the position shown in Fig. 1, whereby hose 15 and nipple 25 are shut off and hose 17 and nipple 26 are connected through nipple 27 and pipe 28 to the exhaust 30 to the atmosphere.

In order to hold the valve handle 23 in the position connecting hose 15 and 17 and disconnecting exhaust 30, as shown in Figs. 2 and 4, the valve handle 23 is provided with a slot 31 into which extends the finger 32 of a trigger 33, pivoted at 34 to an upright 35, supported on the housing 20. As long as this finger 32 remains within slot 31, the valve handle 23 is held in the position connecting hose 15 and 17, permitting operation of the pneumatic tool 10. Also mounted within the housing 20 is a solenoid 36 within which is provided an armature 37 having a shoulder 38 adapted to abut against a shoulder 40 within the solenoid 36 when the armature 37 has passed the magnetic dead center and comes to a stop. This armature 37 is provided with a tripping dog 41 which extends through an opening in the top of the housing 20 and is so located that when moved vertically by the operation of the solenoid 36, it hits the bottom of the trigger 33 and raises the finger 32 out of valve handle slot 31 to a position at 32', thereby releasing the handle 23 for rotation by the coil spring 29 so as to instantly rotate the valve plug 22 from the position shown in Figs. 2 and 4 to the position shown in Fig. 1, thereby disconnecting the supply pressure hose 15 and connecting the tool pressure hose 17 to the exhaust 30.

Connected to the solenoid 36 is one electrical conduit 42 which runs along the air hose 17 and is grounded as by a clamp 43 to any metallic portion of the pneumatic tool 10. The other electrical conduit 44 from the solenoid 36 extends to a source of power such as a series of batteries 45 and thence through a line 46 to a good grounding 47 as by means of a clamp 48 to a water pipe 50 in the vicinity where the work is being carried on. Obviously, should water pipe 50 be interconnected to the hidden water pipe 14, an even better grounding is secured. As shown, the source of electrical supply is a series of dry batteries provided about nine volts, although line current of 32 volts D. C. would be safe with the drillman 11 wearing insulating gloves 51.

In operation, instead of the pressure supply hose 15 being connected directly to the tool 10, it is connected by means of the safety valve 16 of this invention through the tool hose 17, the valve handle 23 being held in proper position by the finger 32 of trigger 33. The conduit line 44 and source of power 45 are connected through a suitable grounding, as already described. When using the tool, as in drilling through concrete 13 to expose the buried water pipe 14, it is possible that at some time or other the bull point 12 will contact the buried water pipe 14. Obviously, repeated contact with the water pipe would quickly break or damage it. However, with the safety valve connected as described, the first contact of the bull point 12 with the water pipe 14 will complete the circuit and cause the solenoid 36 to raise the armature 37, thereby tripping the trigger 33 and releasing the valve handle 23, whereby the coil spring 29 will actuate the rotary valve plug 22 and disconnect the pressure supply hose 15 from the tool hose 17, and instead connect the tool hose 17 to the exhaust 30, thus immediately cutting off any further pressure supply to the tool 10, and simultaneously releasing the pressure in the tool 10 to the atmosphere. Obviously, the bull point 12 will instantly cease to operate and the drillman 11 will know that he has contacted the water pipe. He will, therefore, move his bull point from that position to another position and then reset the valve handle 23 and trigger 33 back to the cocked position shown in Fig. 2, before continuing his drilling.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A safety valve for use in the pressure supply line to a pneumatic tool, said valve comprising a three-way valve body connected in the pressure supply line and dividing it into a source of supply pressure line and a pneumatic tool pressure line, one way of said valve body being connected to said source of supply pressure line, a second way of said valve body being connected to said pneumatic tool pressure line, a pressure exhaust connected to the third way of said valve body, a valve plug in said valve body adapted to connect said pneumatic tool pressure line to either said valve body exhaust or to said source of supply pressure line and simultaneously to disconnect the other, yieldable means normally urging said valve to move to the position disconnecting said source of supply pressure line way and connecting said pneumatic tool pressure line way to said exhaust way, releasable trigger means holding said valve from such movement, a solenoid for actuating said trigger means, and a circuit to said solenoid adapted to connect the pneumatic tool through a source of electrical power to a grounding means for actuating said solenoid when the pneumatic tool completes the circuit as by contacting a grounded member.

2. A safety valve for a pneumatic tool, comprising a three-way valve body, a pressure line adapted to connect said valve body to the pneumatic tool, means for connecting said valve body to a pressure supply line from a source of pressure and a pressure exhaust connected to said valve body, a valve in said valve body adapted to connect said pneumatic tool pressure line to either said valve body exhaust or to said pressure supply line and simultaneously to disconnect the other, a valve handle for controlling said valve, releasable trigger means holding said valve handle in the position connecting said pressure supply line to said pneumatic tool pressure line and disconnecting said exhaust therefrom, yieldable means normally urging said valve to move to the position disconnecting said pressure supply line and connecting said pneumatic tool pressure line and said exhaust, a solenoid for actuating said trigger means, and a circuit to said solenoid connected to the pneumatic tool through a source of electrical power to a grounding means for actuating said solenoid when the pneumatic tool completes the circuit as by contacting the grounded member.

3. A safety valve for use in the pressure supply line to a pneumatic tool, said valve comprising a three-way valve body connected in the pressure supply line and dividing it into a source of supply pressure line and a pneumatic tool pressure line, one way of said valve body being connected to said source of supply pressure line, a second way of said valve body being connected to said pneumatic tool pressure line, a pressure exhaust connected to the third way, a valve plug in said valve body connecting said pneumatic tool pressure line way to either said valve body exhaust way or to said source of supply line pressure way, yieldable means normally urging said valve plug to the position disconnecting the source of supply pressure line way and connecting said pneumatic tool pressure line way to said exhaust way, cockable trigger means holding said valve against yielding to said yieldable means, and a circuit for tripping said trigger means.

4. A safety valve for use in the pressure supply line to a pneumatic tool, said valve comprising a three-way valve body connected in the pressure supply line and dividing it into a source of supply pressure line and a pneumatic tool pressure line, one way of said valve body being connected to said source of supply pressure line, a second way of said valve body being connected to said pneumatic tool pressure line, a pressure exhaust connected to the third way, a valve plug in said valve body connecting said pneumatic tool pressure line way to either said valve body exhaust way or to said source of supply line pressure way, yieldable means normally urging said valve plug to the position disconnecting said source of supply pressure line way and connecting said pneumatic tool pressure line way and said exhaust way, a cockable trigger means for holding said valve against yielding to said yieldable means, a circuit for tripping said trigger means, said circuit including a source of power to a grounding means, said circuit being connected to the pneumatic tool to be completed when said pneumatic tool contacts a buried metallic member.

5. A safety valve for use in the pressure supply line to a pneumatic tool dividing said pressure supply line into a source of supply pressure line and a pneumatic tool pressure line, said safety valve comprising a housing, a three-way valve body in said housing, said three-way valve body including a nipple at each of the three ways, one nipple being adapted for connection to said pneumatic tool pressure line, a second nipple being adapted for connection to said source of supply pressure line, and a third nipple being adapted for exhausting therethrough to the atmosphere, a rotary plug valve in said valve body for completing the passageway from said first nipple to either said second nipple or to said third nipple and simultaneously blocking the passageway to the unconnected nipple, yieldable means normally urging said valve plug to the position completing said passageway between said pneumatic tool nipple and said exhaust nipple, a cockable trigger means for holding said valve in the position connecting said source of supply pressure line nipple to said pneumatic tool pressure line nipple and disconnecting said exhaust nipple, a solenoid in said housing and an armature in said solenoid for tripping said trigger means, permitting said yieldable means to cut off said source of supply pressure nipple and connect said pneumatic tool pressure line nipple to said exhaust nipple.

6. A safety valve for use in the pressure supply line to a pneumatic tool dividing said pressure supply line into a source of supply pressure line and a pneumatic tool pressure line, said safety valve comprising a housing, a three-way valve body in said housing, said three-way valve body including a nipple at each of the three ways, one nipple being adapted for connection to said pneumatic tool pressure line, a second nipple being adapted for connection to said source of supply pressure line, and a third nipple being adapted for exhausting therethrough to the atmosphere, a rotary plug valve in said valve body for completing the passageway from said first nipple to either said second nipple or to said third nipple and simultaneously blocking the passageway to the unconnected nipple, yieldable means normally urging said valve plug to the position completing said passageway between said pneumatic tool nipple and said exhaust nipple, a cockable trigger means for holding said valve in the position connecting said source of supply pressure line nipple to said pneumatic tool pressure line nipple and disconnecting said exhaust nipple, a solenoid in said housing, an armature in said solenoid for tripping said trigger means, permitting said yieldable means to cut off said source of supply pressure nipple and connect said pneumatic tool pressure line nipple to said exhaust nipple, and a circuit to said solenoid connecting said pneumatic tool, a source of electrical power and a grounding means whereby when said pneumatic tool contacts a buried metallic member the circuit is completed, tripping said trigger means and permitting said yieldable means to actuate said valve and automatically and instantaneously stop the operation of the pneumatic tool.

7. A safety valve for a pneumatic tool, comprising a valve means, a pneumatic tool pressure line adapted to connect said valve means to the pneumatic tool, means for connecting said valve means to a pressure supply line from a source of pressure, a pressure exhaust connected to said valve means, said valve means being adapted to connect said pneumatic tool pressure line to either said pressure exhaust or to said pressure supply line and simultaneously to disconnect the other, a control means for said valve means, releasable means holding said control means in the position connecting said pressure supply line to said pneumatic tool pressure line and disconnecting said exhaust therefrom, yieldable means normally urging said valve means to the position disconnecting said pressure supply line and connecting said pneumatic tool pressure line to said exhaust, a solenoid for actuating said releasable means and a circuit to said solenoid connected to the pneumatic tool through a source of electrical power to a grounding means for actuating said solenoid when the pneumatic tool completes the circuit as by contacting the grounded member.

8. A safety valve for a pneumatic tool, comprising a valve means, a pneumatic tool pressure line adapted to connect said valve means to the pneumatic tool, means for connecting said valve means to a pressure supply line from a source of pressure, a pressure exhaust connected to said valve means, said valve means being adapted to connect said pneumatic tool pressure line to either said pressure exhaust or to said pressure supply line and simultaneously to disconnect the other, a control means for said valve means, releasable means holding said control means in the position connecting said pressure supply line to said pneumatic tool pressure line and disconnecting said exhaust therefrom, yieldable means normally urging said valve means to the position disconnecting said pressure supply line and connecting said pneumatic tool pressure line to said exhaust, and means for actuating said releasable means.

9. A safety valve for a pneumatic tool, comprising a valve means, a pneumatic tool pressure line adapted to connect said valve means to the pneumatic tool, means for connecting said valve means to a pressure supply line from a source of pressure, a pressure exhaust connected to said valve means, said valve means being adapted to connect said pneumatic tool pressure line to either the pressure exhaust or to said pressure supply line and simultaneously to disconnect the other, a control means for said valve means, releasable means holding said control means in the position connecting said pressure supply line to said pneumatic tool pressure line and disconnecting said exhaust therefrom, yieldable means normally urging said valve means to the position disconnecting said pressure supply line and connecting said pneumatic tool pressure line to said exhaust, and means for actuating said releasable means, said actuating means comprising a circuit completable through the pneumatic tool.

10. A safety valve for use in the pressure supply line to a pneumatic tool, said valve comprising a three-way valve body connected in the pressure supply line and dividing it into a source of supply line and a pneumatic tool pressure line, one way of the valve body being connected to said source of supply pressure line, a second way of the valve body being connected to said pneumatic tool pressure line, a pressure exhaust connected to the third way, a valve plug in said valve body connecting the tool pressure line way to either the valve body exhaust way or to the source of supply line pressure way, yieldable means normally urging said valve plug to the position disconnecting the source of supply pressure line way and connecting said pneumatic tool pressure line way to said exhaust way, releasable means holding said valve against yielding to said yieldable means, and a circuit for releasing said releasable means.

EVERETT B. MADDOX.